J. G. CHILDS.
WIND TURBINE.
APPLICATION FILED OCT. 24, 1910. RENEWED FEB. 9, 1914.

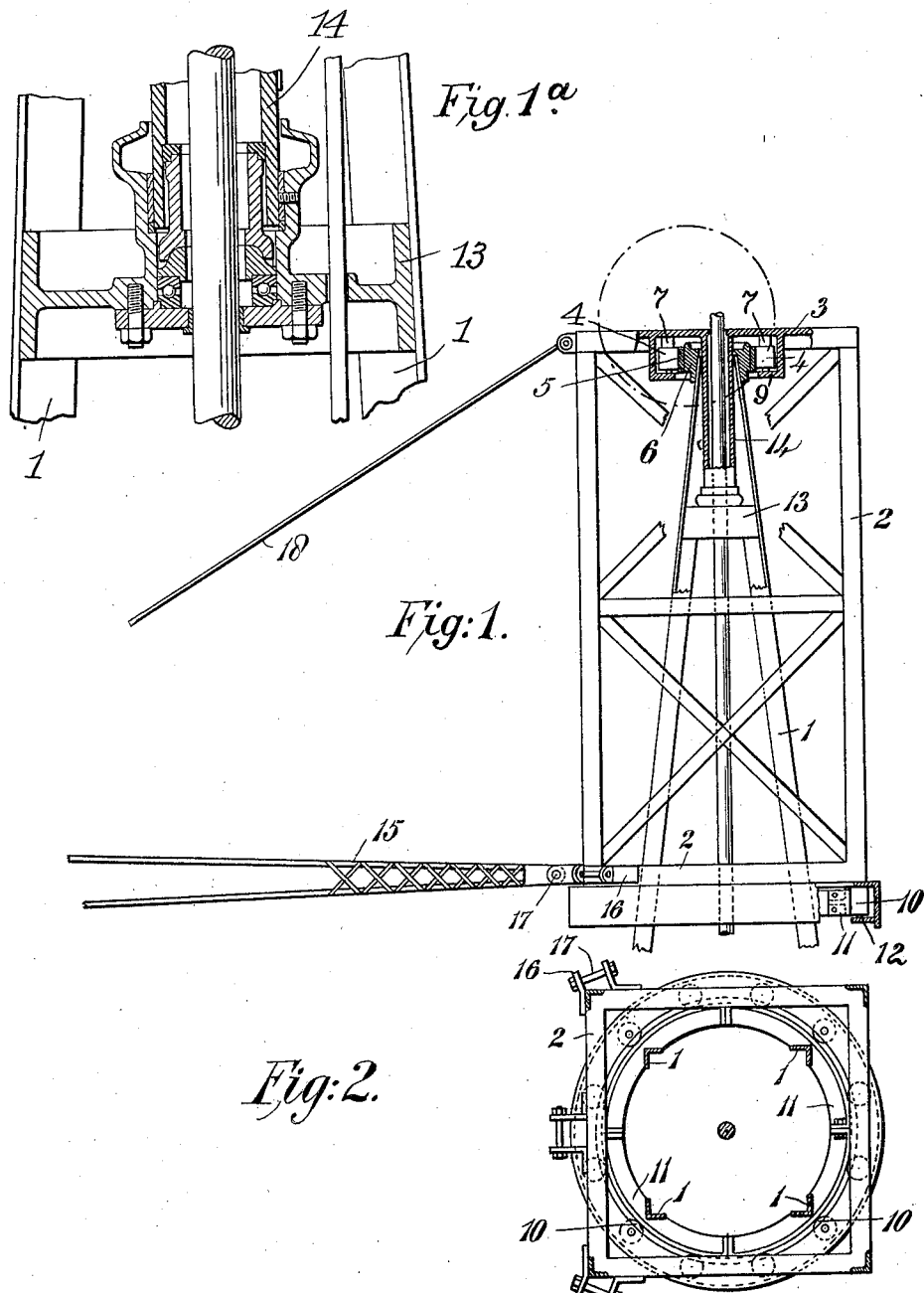

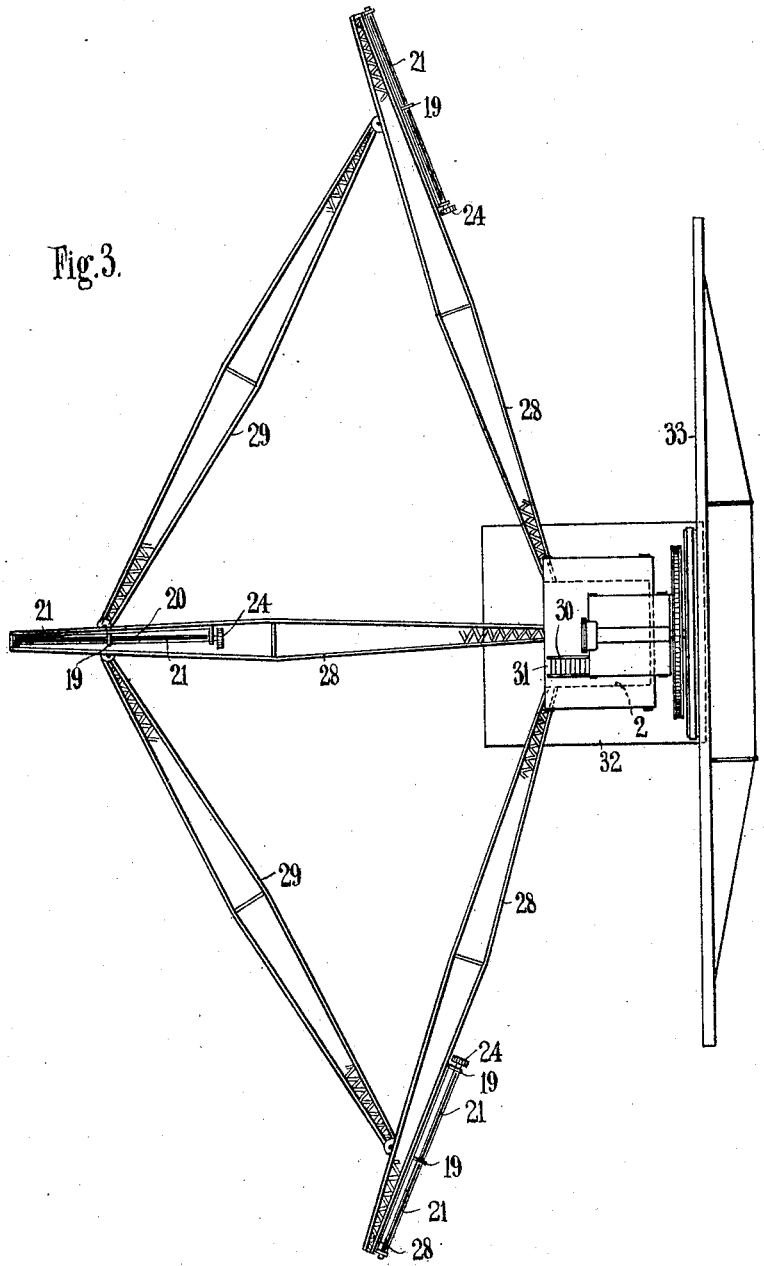

1,110,535.

Patented Sept. 15, 1914.
5 SHEETS—SHEET 3.

Witnesses
E. W. Moore
L. E. Barkley

Inventor
Joseph Gershom Childs
per Shanks & Newman
Attorney.

J. G. CHILDS.
WIND TURBINE.
APPLICATION FILED OCT. 24, 1910. RENEWED FEB. 9, 1914.
1,110,535.
Patented Sept. 15, 1914.
5 SHEETS—SHEET 4.
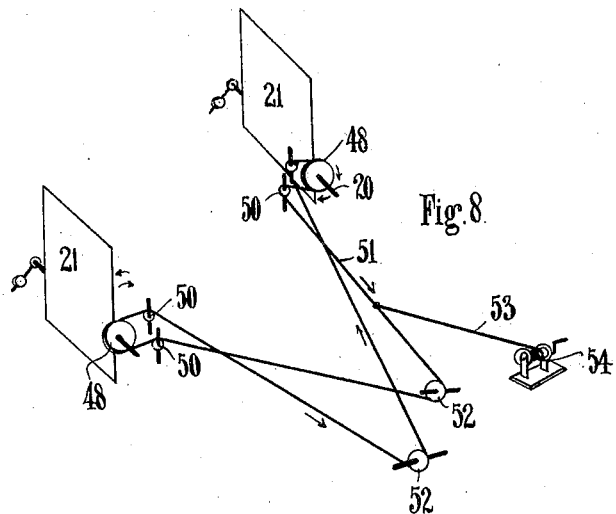
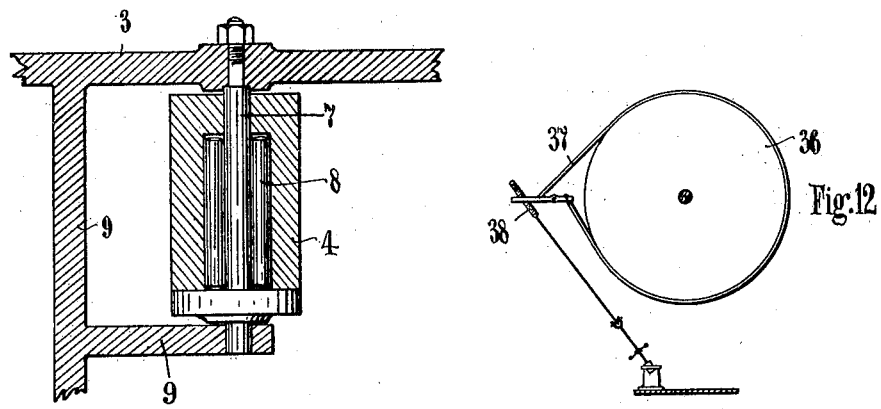
Witnesses
E. W. Moore
L. E. Barkley
Inventor
Joseph Gershom Childs
per Hauks Anneman
Attorney

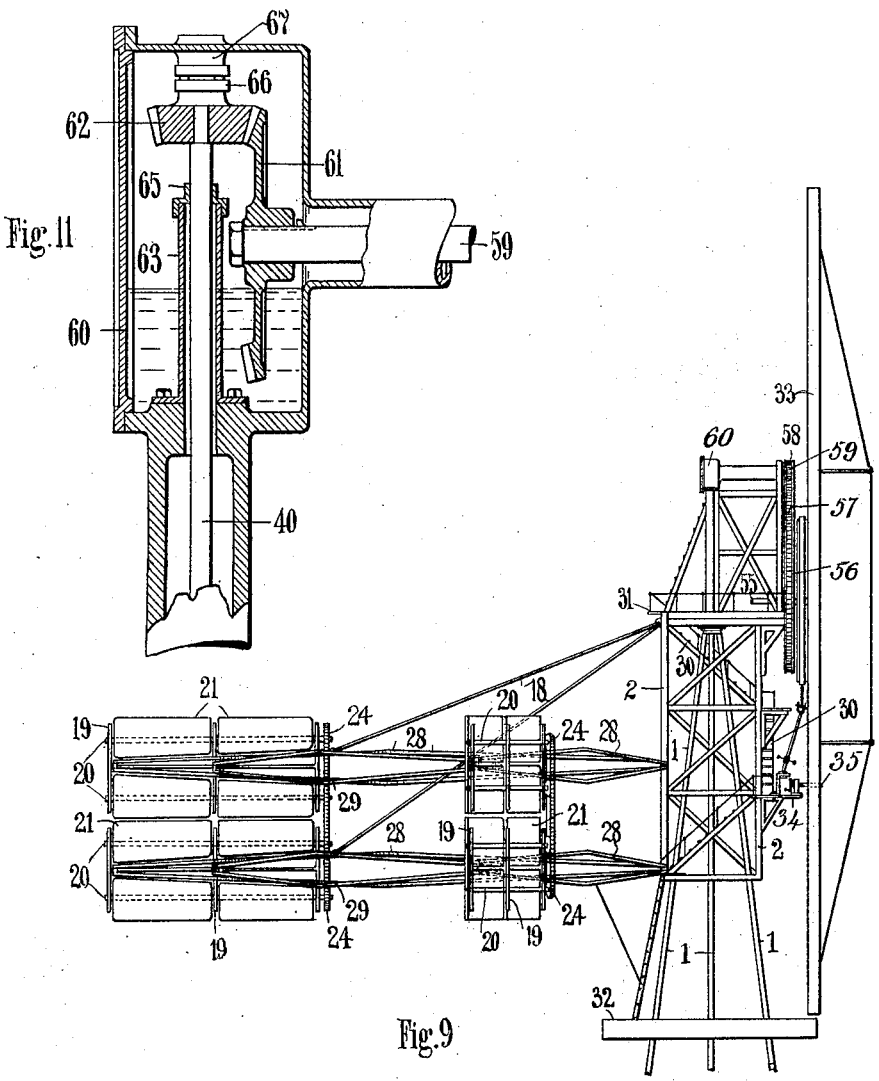

UNITED STATES PATENT OFFICE.

JOSEPH GERSHOM CHILDS, OF WILLESDEN GREEN, LONDON, ENGLAND.

WIND-TURBINE.

1,110,535. Specification of Letters Patent. Patented Sept. 15, 1914.

Application filed October 24, 1910, Serial No. 588,885. Renewed February 9, 1914. Serial No. 817,669.

*To all whom it may concern:*

Be it known that I, JOSEPH GERSHOM CHILDS, a subject of the King of Great Britain, residing at Hawthorn Road, Willesden Green, in the county of London, England, have invented new and useful Improvements in Wind-Turbines, of which the following is a specification.

This invention relates to wind turbines and in particular to installations of considerable size; its purpose is to provide light, strong and reliable structures.

To this end the invention comprises in the first instance a new form of rotating head which surrounds the upper part of the turbine tower. Also the invention includes a novel disposition of the supporting bearings for such rotating part.

It is a further object of the invention to provide similarly light and strong structures for the support of the turbine tails or control vanes, and further to make such vanes themselves readily controllable in spite of their size.

Yet another object of the invention is to improve the mounting of the turbine wheel and its driving communication with the shaft to which it gives power.

Yet another object of the invention and the means by which they are attained will appear from what follows, and will be more particularly pointed out in the appended claims.

Figure 4:
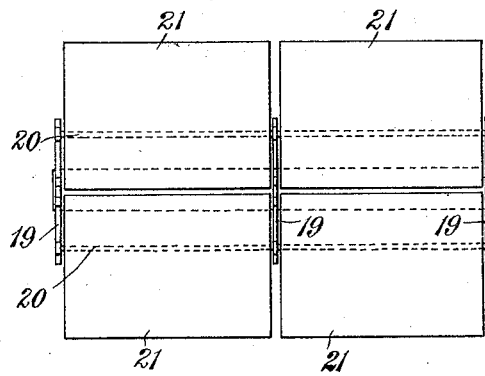
Figure 6:
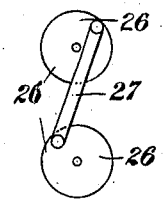
Figures 7, 13:
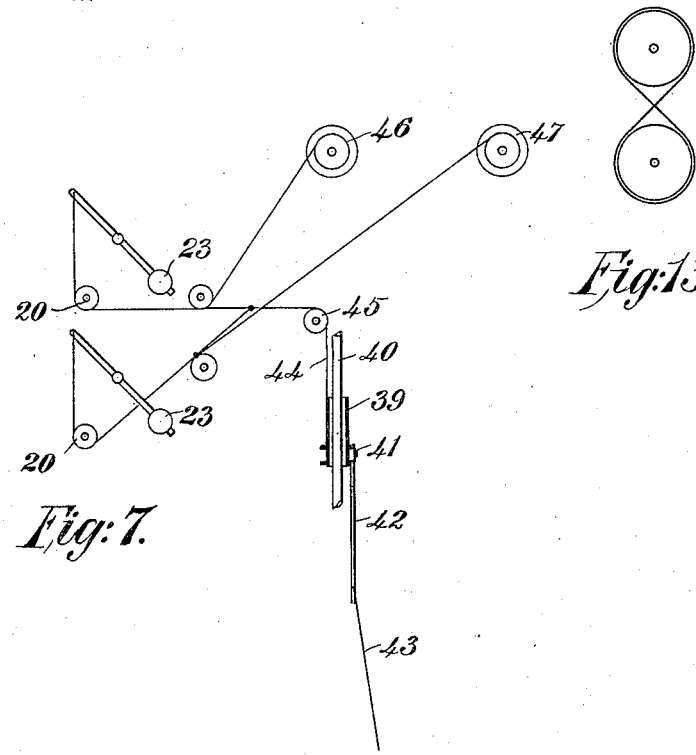

In the accompanying drawings—Figure 1 is an elevation of the top of a tower with the rotating portion mounted thereon; Fig. 1ª is an enlarged sectional detail illustrating the thrust bearing; Fig. 2 is a plan of the same; Fig. 3 is a plan of the tower head showing the supports for the control vanes; Fig. 4 is a face elevation, and Fig. 5 an edge elevation of one of said vanes showing the mechanism by which the parts are interconnected. Fig. 6 is an alternative structure of such mechanism; Fig. 7 diagrammatically illustrates the disposition of the controlling devices for the vanes; Fig. 8 illustrates an alternative disposition of said controlling devices. Fig. 9 is an elevation of a tower head with vane supports for extra large installations; Fig. 10 is a detail of the supporting bearing for the tower head; Fig. 11 is a detail of the gear box for the driving gears; Fig. 12 diagrammatically illustrates a device for holding the wheel stationary.

Figure 5:
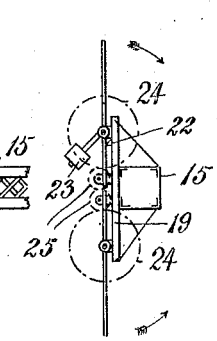

Fig. 13 illustrates another alternative to Fig. 5.

In the structure shown in Fig. 1 the turbine tower is as heretofore composed of inclined angle bars 1 say four in number. These are suitably stayed so as to form an openwork tower of considerable strength. The rotating head for the turbine is formed by a steel lattice framing 2 surrounding the top of the tower. A plate 3 secured on the upper end of this framing carries rollers 4 which run upon a track 5 secured on a casing 6 at the top of the tower.

As may be seen in further detail in Fig. 10 the rollers 4 are preferably mounted on stationary pins 7 with an intervening roller bearing 8. The plate 3 has a flange 9 extending beneath the rollers and receiving one end of the pins 7. A second similar roller bearing is provided at the bottom of the rotating frame and consists of rollers 10 secured upon the frame and running on a track 11. These rollers are in part protected from exposure by the angle irons forming the base of the rotating frame but are further covered in by the flange 12 which supports the lower ends of their axles. These two bearings suffice to guide the rotating structure and being considerably distant apart they readily take up any lateral stress to which the rotating head may be subjected. The weight of the rotating head is taken by a thrust bearing with a spherical seating which rests upon a casting 13 secured to the tower. This bearing is described in detail in my concurrent application Serial No. 588,883. As there described the bearing is formed at the end of a tube 14 which is here secured to plate 3. As, however, this tube now plays no part in laterally supporting the rotating head it need not be so long as in the former structure.

It will be clear that the details of the lattice work structure 2 may be varied at will. The lattice work may even be replaced by a riveted steel tube. Moreover it is not essential that the weight should be taken by a central bearing though this is preferable. The bearing can be provided beneath one or other of the journal bearings.

With wind turbines of the size for which the features above described are intended, namely, for turbines having wheels of from 30 to 50 feet in diameter and much more with still larger sizes, the supports for the control vanes become very large structures. As indicated at 15, Fig. 1, they are now formed as lattice girders of suitable type generally resembling the jib of a large crane. Moreover on account of their weight and the difficulty of getting them into position they are made to resemble a crane jib in yet another important respect. Projecting steel plates 16 provided on the rotating lattice frame 2 have a circular opening to receive a pin. The ends of the girders 15 fit between the plates 16 and are also perforated. A pin 17 passed through the girder and plates 16 forms a pivot about which the girder can rotate. This structure enables the girder to be hauled up the side of the tower in approximately vertical position; its inner end is then set in place between the plates 16 and pin 17 inserted. The girder is then lifted into approximately horizontal position by means of a winch secured on the upper platform of the tower, i. e., on or above plate 3 and the girder is secured in such desired position by guide stays 18.

In such large installations the vanes themselves become extremely unwieldy and the wind pressure upon them is liable to produce serious strains. As described in my earlier application, Serial No. 542,117 two of the three control vanes are made revoluble on axes. For the large sizes now under discussion the vane is divided into several portions, see Fig. 4. Cross bars 19 secured to the girder 15 support transverse shafts 20. In the structure shown there are three cross bars 19 as the shafts 20 are sufficiently long to require support in the middle. Obviously the number of bearing supports will vary with the size of the vane. Vane plates 21 constructed in desired manner are secured non centrally to the shafts 20. Thus wind pressure on the vane tends to rotate the shafts 20. Stops 22 prevent rotation in one direction while a balance weight 23 preferably adjustable tends to prevent rotation in the opposite direction. In order that the parts of the vane may move together the two shafts 20 are connected by gear wheels 24 thereon and a pair of intervening pinions 25. Instead the shafts may be connected by pinions and a rack or crossed chain or by disks 26 and a crossed link 27 shown in Figs. 6 and 13.

In the structure shown in Fig. 9 intended for still larger installations having wheels from 50 to 100 feet in diameter, each tail or vane is supported by a pair of lattice girders 28 between which the cross bars 19 will extend. This gives the vane a wider support. These girders are pivoted to the rotating lattice work 29 so that they may be readily hauled into position as above described. In this structure the vane may be still further sub-divided inasmuch as each girder 28 may support a group of vane plates as illustrated in Fig. 4. The shafts 20 are then not only connected in pairs but the pairs are also interconnected so that all the parts move together.

As may be seen from Figs. 3 and 9 the girders supporting the vanes are strengthened by transverse girders 29 connecting them at approximately the center point of the vanes. In Fig. 9 also are shown the ladders 30 by which access is had to the upper platform 31 secured at the top of the rotating frame 2. The foot of the lowest ladder rotates within the lower platform 32.

When repairs are to be executed it is desirable that the turbine wheel diagrammatically indicated by 33 in Fig. 9 should be rigidly held to prevent rotation. To this end a bracket 34 may be provided on the lower platform 32 and perforated to receive a bolt 35 which will pass also through any one of a number of suitably disposed perforations in the structure of the turbine wheel. Alternatively or in addition there may be secured to the turbine wheel as indicated in Fig. 12 a brake drum 36 around which passes a brake band 37 which can be tightened by means of the screw 38 or otherwise. Again a pair of chains could be provided by which some portion of the wheel could be secured against motion in either direction by attachment to the platform 32 or other part.

Returning to the control vanes it is necessary that as heretofore there shall be some means of rotating these vanes by hand so that the wheel may be turned out of the wind when desired. For operation from the ground the structure described in my concurrent application Serial No. 588,883, may be adopted. This comprises a sleeve 39 sliding upon the central shaft 40 see Fig. 7 by which power is transmitted from the wheel. The sleeve has collars between which engages a roller 41 fastened upon the suitably guided rod 42 from which a cord 43 proceeds to a handle at the ground level. Another cord or chain 44 attached to sleeve 39 passes over pulley 45 and then divides. Each of its ends passes to a shaft 20 of one of the vanes or to a drum secured on said shaft. Since the shafts of each vane are interconnected tension on cord 43 operates all the vane parts of both the movable vanes. If it is desired to operate the two vanes independently from below, the structure 39, 41, 42, 43, 44, 45 is duplicated. It may be requisite also to be able to turn the vanes out of the wind from the platform of the tower as well as from the ground. In the structure shown in Fig. 7 46, 47 indicate two winches upon one of the platforms of the tower each adapted to control one of the vanes. If desired both vanes may be controlled by a single winch as indicated in Fig. 8. In this case the two shafts 20 shown are supposed to be one in each of the two movable vanes. They bear pulleys or drums 48 to which are secured cords 49 fastened at their other ends to the drums 50. These drums are conveniently interconnected by an endless rope 51 which passes around guide wheels 42 secured upon the central tower, the ropes 51 running along the respective girders 15 which support the vanes. A second rope 53 secured to the rope 51 and passing to winch 54 enables both vanes to be simultaneously operated. It will be noted also that the connection 51 causes the vanes to work together under wind action replacing the shafts and gear wheels heretofore employed for this purpose which in such large structures would either be too cumbrous or mechanically unsatisfactory. In these large structures it is inconvenient because mechanically difficult, to provide the wheel with a rotating shaft. Instead therefore, as is indicated in Fig. 9, the wheel 33 rotates upon a stationary shaft 55 and carries a gear wheel 56. This is connected by a chain 57 to a pinion 58 on a shaft 59 which passes into the gear box 60. This gear box is shown in enlarged section in Fig. 11. At its inner end shaft 59 carries a bevel pinion 61 which gears with another bevel pinion 62 secured upon the top of the vertical shaft 40. Around the opening in the gear box 60 through which the shaft 40 passes there is secured by an oil tight joint a sleeve 63 which extends about half way up the gear box. There is secured to the shaft 40 above the end of sleeve 63 a drip plate 65. This structure permits the gear box to be filled with lubricant up to about the level shown without fear of leakage. Thus the bevel wheel 61 is almost half immersed in the lubricant and will carry it up to supply pinion 62. The plates 65 will prevent lubricant dropping from pinion 62 out of the gear box. As before the shaft 40 is supported by a journal bearing 66 and upward and downward thrust bearings 67.

What I claim is:—

1. In a wind turbine the combination of a tower, a turbine head rotating upon and inclosing the top of said tower, a turbine wheel journaled in said head, journal roller bearings at the top and bottom of said head surrounding said tower and a covering inclosing said roller bearings and protecting them from exposure.

2. In a wind turbine the combination of a tower, a turbine head rotating upon and inclosing the top of said tower, a turbine wheel journaled in said head, roller bearings carried by said head spaced apart at the top and bottom of said head and surrounding said tower, a thrust bearing taking the weight of said head and flanged boxings carried by said head and totally inclosing said roller bearings and serving as a protection for them against the weather.

3. In a wind turbine the combination of a tower, a turbine head rotating upon and inclosing the top of said tower, a turbine wheel journaled in said head, roller bearings between said head and said tower surrounding the tower, a central sleeve fitted to said head, a thrust bearing supporting said sleeve and head, a spherical seating to said thrust bearing and covers carried by said head and protecting said roller bearings from exposure.

4. In a wind turbine the combination of a tower, a turbine head rotatably mounted thereon, two ears projecting therefrom, a pivot passing between said ears, a girder on said pivot and between said ears, stays for maintaining said girder in position with regard to said head, and a controlling vane carried on said girder.

5. In a wind turbine the combination of a tower, a rotatable head thereon, girders extending laterally from said head, transverse members secured to said girders, shafts bearing vane plates secured in said transverse members, said vane plates being non-centrally mounted so as to be rotatable in opposite directions by wind pressure.

6. In a wind turbine, the combination of a tower, a rotatable head thereon, vertically disposed pairs of girders extending laterally therefrom, transverse members connecting the girders of each pair, and vane plates rotatably mounted between said transverse members.

7. In a vane for wind turbines, the combination of a supporting member, a pair of shafts secured thereon, vane plates non-centrally mounted on said shafts and connections between said shafts causing them to rotate simultaneously in opposite directions.

8. In a wind turbine, the combination of a tower, a rotatable head thereon, mutually inclined girders extending laterally therefrom, vanes rotatably mounted on said girders and flexible means interconnecting the vanes on said inclined girders.

9. In a wind turbine, the combination of a tower, a rotatable head thereon, a plurality of rotatable controlling vanes extending laterally from said head, means for rotating said vanes by hand from the ground, and means for rotating said vanes by hand from the top of the tower.

10. In a wind turbine the combination with the turbine wheel of a horizontal shaft driven thereby, a bevel wheel on the end of said shaft, a vertical shaft, a bevel pinion on the end of said vertical shaft above but intermeshing with said bevel wheel, a gear box surrounding said bevel wheel and pinions, and a sleeve upstanding in said gear box around the vertical shaft.

11. In a wind turbine, the combination of a tower, a turbine head surrounding said tower, a cylindrical tube projecting downward from the upper surface of said head, a casting uniting the members of said tower, a thrust bearing carried by said casting and carrying said tube and taking the weight of said head, and roller bearings spaced apart at the top and bottom of said head between said head and said tower.

12. In a wind turbine the combination of a tower, of metal framework, a turbine head rotatably mounted upon and surrounding said tower, a cylindrical tube projecting downward from the upper surface of said head, a casting uniting the members of said tower at some distance from the top, a spherical thrust bearing fixed on said casting and supporting said tube and head, and roller bearings at the top and bottom of said head between said head and said tower.

13. A support for a turbine head carrying roller bearings at its top and bottom comprising in combination a cylindrical tube, a tower of metal framework, tracks on the outside of said tower upon which the roller bearings run, and a spherical thrust bearing beneath said tube carried by a cross member of said tower.

14. In a wind turbine the combination of a tower, a turbine head mounted rotatably thereon, vertically disposed pairs of girders extending laterally therefrom, transverse members secured to each of said girders, a pair of parallel shafts mounted upon the transverse members secured to each of said girders, a pair of parallel shafts mounted upon the transverse members of each girder, a series of vane plates mounted non-centrally at intervals along each of said shafts, and connections between each series of vane plates causing them to rotate simultaneously in opposite directions.

15. A turbine head formed of metal framework comprising in combination an upper platform, a lower platform, vertical members connecting said two platforms, cross strut members interconnecting said vertical members, roller bearings carried beneath said upper and lower platforms, and a cylindrical tube projecting downward from the under side of said upper platform.

16. A turbine head of metal framework comprising in combination an upper platform, a lower platform, vertical members connecting said two platforms, cross strut members interconnecting said vertical members, roller bearings carried beneath said upper and lower platforms, flanged boxings carried by said platforms for protecting said roller bearings, and a cylindrical tube projecting downward from the under side of said upper platform.

17. In a wind turbine, the combination of a tower of metal framework, a turbine head formed of strutted metal frames rotatable upon and inclosing the top of said tower, roller bearings at the top and bottom of said head between said head and said tower, a platform upon the top of said head, a platform fixed to said tower and below said head, a ladder fixed to the bottom of said head and with its lower end rotating on said platform on the tower, a ladder between the lower and upper parts of said head, and a turbine wheel and controlling vanes secured upon said head.

18. A vane for wind turbines comprising in combination a supporting member, a pair of parallel shafts mounted thereon, a series of vane plates mounted non-centrally at intervals along each of said shafts and connections between each series of vane plates causing them to rotate simultaneously in opposite directions.

19. In a wind turbine the combination of a tower, a turbine head mounted rotatably thereon, a plurality of rotatable controlling vanes extending laterally from said head and means for rotating said vanes by hand from the top of the tower.

20. In a wind turbine, the combination of a tower, a turbine head mounted rotatably thereon, a plurality of rotatable controlling vanes extending laterally from said head, and means for rotating all of said vanes simultaneously and correspondingly from the top of the tower.

21. In a wind turbine, the combination of a tower, a turbine head mounted rotatably thereon, girders extending laterally from said head, shafts carried by said girders, vane plates non-centrally mounted on said shafts and means for rotating said vane plates from the top of the tower.

In testimony whereof I have signed my name to this specification in the presence of two subscribing witnesses.

JOSEPH GERSHOM CHILDS.

Witnesses:
LEONARD E. HAYNES,
A. E. ODELL.

---

Copies of this patent may be obtained for five cents each, by addressing the "Commissioner of Patents, Washington, D. C."